Aug. 27, 1935.     W. J. VOCKE     2,012,859
INDEXING DEVICE FOR DIVIDING HEADS
Filed Oct. 30, 1933
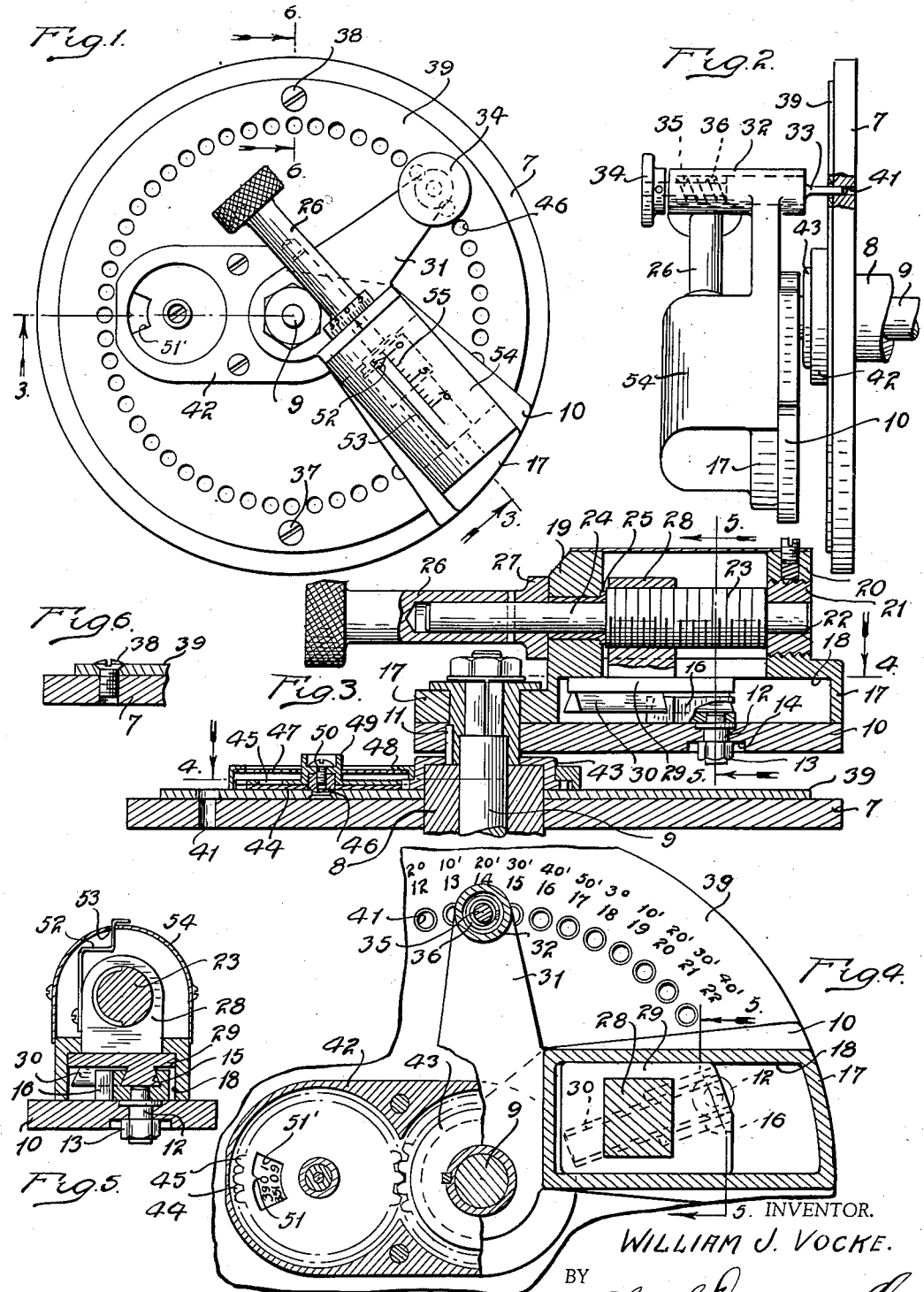

Patented Aug. 27, 1935

2,012,859

UNITED STATES PATENT OFFICE 2,012,859

INDEXING DEVICE FOR DIVIDING HEADS

William J. Vocke, Detroit, Mich.

Application October 30, 1933, Serial No. 695,914

7 Claims. (Cl. 90—57)

My invention relates to a new and useful improvement in an indexing device for dividing heads for use on milling machines and the like in which the indexing device is used for determining the rotation of the spindle of dividing heads.

It is an object of the present invention to provide an indexing device of this class which will be simple in structure, economical of manufacture, durable, highly efficient in use and easily and quickly operated.

Another object of the invention is the provision of an indexing device in which a plurality of indicating plates may be dispensed with.

Another object of the invention is the provision of an indexing device whereby any desired number of revolutions or frictional parts thereof may be easily and quickly obtained and clearly indicated.

Another object of the invention is the provision in an indexing device of a counting mechanism so arranged as to indicate the revolutions of the spindle and also adjusted for movement to various positions to indicate initial starting position.

Other objects will appear hereinafter.

The invention consists in the combination and arrangement of parts hereinafter described and claimed.

The invention will be best understood by a reference to the accompanying drawing which forms a part of this specification, and in which, Fig. 1 is a front elevational view of the invention.

Fig. 2 is a side elevational view of the invention.

Fig. 3 is a fragmentary, sectional view taken on line 3—3 of Fig. 1.

Fig. 4 is a fragmentary, sectional view taken on line 4—4 of Fig. 3, with parts broken away.

Fig. 5 is a sectional view taken on line 5—5 of Fig. 4.

Fig. 6 is a fragmentary sectional view taken on line 6—6 of Fig. 1.

In the drawing I have illustrated a supporting plate 7 which is mounted on the bushing 8 through which the shaft 9 projects. This shaft 9 is the usual shaft which serves upon its rotation for actuating and rotating the spindle of the dividing head, and in the usual types of structures, forty revolutions of the shaft 9 effects a single revolution of the spindle of the dividing head. To accurately indicate fractional parts of complete revolutions of the spindle of the dividing head is the purpose of the indexing plate or indexing device, and it is obvious that for each revolution of the shaft 9, since the relation between the shaft 9 and the spindle of the dividing head is forty to one, there would be effected a rotation of the spindle of the dividing head nine degrees.

Fixedly mounted on the shaft 9 is an arm 10 secured thereto by the key 11. Projecting through the arm 10 is a stud 12 on which is threaded the nut 13 which engages in the recess 14. Swivelly connected to the upper end of the stud 12 is a slide block 16 having the dovetailed groove 15 formed in its upper surface. Swingably mounted on the shaft 9 is an arm 17 which is hollowed out at its outer portion as at 18. Projecting upwardly from this arm 17 are the spaced standards 19 and 20. Threaded into an opening formed in the standard 20 is a bearing block 21 which serves as a bearing for the shaft 22 which is a reduced extension of the screw 23. A reduced extension 24 projects from the opposite end of the screw 23 and extends through a bearing 25 mounted in the standard 19. Embracing the reduced extension 24 is a handle 26 which is secured to the member 25 by a suitable pin. This member 26 has a peripheral shoulder 27 on its inner end which abuts against the standard 19. A nut 28 is threaded on the screw 23 and adapted for axial movement between the standards 19 and 20. This nut 28 projects upwardly from a slide plate 29 with which it is preferably formed integral. Projecting outwardly from the slide plate 29 is an actuating wedge or rib 30 which serves to function as a cam. This rib 30 is formed to fit in the dove-tailed groove 15 slidably. As clearly appears in Fig. 4, the rib 30 extends diagonally across the plate 29. This arm 17 constitutes one arm of a yoke, the other arm 31 of which extends substantially at right angles to the outer portion of the arm 17. On the outer end of the arm 31 is mounted a head 32 through which is projected a plunger pin 33. On the outer end of the pin 33 is provided the collar or hand grip 34, this portion 34 being mounted on the reduced extension 35 of the plunger. A spring 36 is mounted in the head 32 to normally resist outward movement of the plunger.

Mounted by the screws 37 and 38 on the outer face of the plate 7 is the index plate 39 in which are formed a plurality of openings 40, each registering with a smaller opening 41 formed in the plate 7.

In the construction shown, I have provided fifty-four of the openings 40 so that the space between each of the openings represents a rotation of ten minutes, thus each six of the openings will represent a degree of rotation, that is, a degree of rotation of the spindle of the dividing head. Mounted on the plate 39 is a housing 42. Mounted on the shaft 9 and extending into the housing is a gear 43 with which is adapted to mesh the gears 44 and 45 which are rotatably mounted on the stud 46 and which are visible through the dial plate 47 set in the opening 48 of the housing. These gears 44 and 45 are preferably formed from any suitable material. The top gear 45 carries the sleeve 49 through which extends the screw 50 which threads into the stud 46. By removing the screw 50, the gear 45 can be raised upwardly so as to disengage the gear 43 so that the gear 45 may be turned to any desired position of starting. The gears 43 and 44 are provided with forty teeth. The gear 45 is provided with forty-one teeth, and the teeth on the gear 45 are cut slightly smaller so that its pitch diameter is of the same radial length as the pitch diameter of the gear 44. Thus a rotation of the gear 43 will effect a rotation of the gears 44 and 45, but for each revolution, there will be a relative displacement of these gears amounting to one tooth. Displayed on the upper surface of the gear 44 which is the bottom gear, are numbers to indicate the numbers of rotations of the gears, and the degree numbers are also indicated on the bottom gear 44. The upper gear 45 is cut away as at 51' and provided with a pointer 51.

The construction is such that when the shaft 9 has been rotated a single rotation, the numeral 1 on the bottom gear will be brought into registration with the indicating mark 51 indicating a single rotation of the shaft 9, and at the same time the numeral 9 will also appear, thus indicating a single rotation of the shaft 9 and a nine degree movement of the dividing head spindle. Similarly, all of the consecutive numbers are displayed in conjunction with a degree indicating member. The rotation numbers displayed are consecutively increased by nine. Thus in alignment with the rotation numbers 2, 3, 4 etc. will be displayed respectively the degree numbers 18°, 27°, 36° etc. Thus it is obvious that the number of rotations of the shaft 9 will always be indicated as well as the fractional parts of rotation thereof so that the operator may, without computing or checking in any manner, be always apprized of the number of rotations or fractional parts thereof which the shaft 9 may have been through.

In operating the device, the mechanism will always be set at zero. When the device is used for simple indexing, that is, indexing in which the proper number of rotations of the shaft 9 may be obtained and leave the arm 31 with the plunger 33 within one of the openings 41, the shaft is rotated to the desired position and the plunger 33 permitted to enter the proper opening 41. The position of the dividing head spindle will then be indicated in degrees and seconds. However, when it is necessary to obtain a rotation of the shaft 9 to a position which lies between the minutes indicated, the sliding plate 29 will be brought into operation. For instance, in the operation indicated in Fig. 4, the shaft 9 has been rotated through two degrees and twenty minutes when the stud 33 is engaged in hole 41. If, however, the operator desires a position of rotation of the shaft 9 of two degrees, twenty-seven minutes and fifteen seconds for instance, the additional seven minutes and fifteen seconds of movement of the shaft 9 is effected by means of the arm 10. The screw 23 is threaded so that each rotation of the screw 23 will effect a movement outwardly of the plate 29 a sufficient distance to bring about a relative movement of the arms 10 and 31 or 10 and 17 so as to rotate the shaft 9 sufficient to effect a movement of one minute. Consequently, ten turns of the screw 23 will move the plate 29 from its innermost to its outermost position. To obtain the position of twenty-seven minutes, therefore, it would be necessary to rotate the screw 23 seven turns. Seven turns would be required because the arm would be moved so that the plunger 33 would be engaged in the hole corresponding to 20 minutes. The seven turns of the screw would effect a further rotation of seven minutes. The seconds of rotation of the screw 23 are indicated by the graduations which appear on the shoulder 27, and these graduations are in seconds. Consequently, after the screw 23 has been rotated through seven revolutions, the rotation of the screw 23 would be continued until the second's graduations indicated fifteen. It is therefore obvious that a ready and easy means of indexing is thus provided, whether the indexing is simple, compound or differential. Furthermore, it will be noted that this is accomplished with a single hole bearing or indexing plate.

The nut 28 carries a pointer 52 which extends through a slot 53 formed in the cover 54. On this cover 54 are provided the graduations 55 which are numbered from one to nine consecutively so that the pointer 52 will indicate on the graduations 55 the number of rotations of the screw 23 from zero or starting position. In this manner the operator may never become confused as to the revolutions through which the screw 23 has been put, and at all times a complete illustration of the operation of the device which the operator has effected is clearly indicated to the operator.

In operation also, when the shaft 9 is rotated to the position for effecting a rotation of the spindle of the dividing head to the position of engaging the workpiece, such position of the shaft 9 would be determined to be the starting position. The arms 31, 10 and 17 may then be in any position relatively to the plates 7 and 39. It is then necessary that the various parts be brought to zero, using this position of the arms 31, 10 and 17 as the starting position. To accomplish this, it is but necessary to remove the screws 37 and 38 and rotate the plate 39 to bring the pointer 51 into position of center of the arm 31 indicated by the mark 53. When this is done, the gears 44 and 45 will be automatically rotated to zero or starting position and the screw 23 may be manually turned to bring the nut 28 to zero position. Thus it is obvious that the device may be easily and quickly set at zero or any position of rotation of the shaft 9 relatively to the plate 7.

While I have illustrated and described the preferred form of construction of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. An indexing device of the class described, adapted for use with a rotatable shaft comprising a plate fixedly mounted concentrically relatively to said shaft, said plate having a circumferential row of spaced openings formed therein;

an arm rotatably mounted on said shaft; a plunger carried by said arm for engaging in said holes; a supporting member carried by said arm and extending angularly thereto; a second arm fixedly mounted on said shaft and adapted for effecting rotation thereof; and means carried by said supporting means adapted upon movement, upon the engagement of said plunger in one of said holes, for effecting an operating of said second arm and rotating said shaft.

2. An indexing device of the class described adapted for use with a rotating shaft comprising a plate mounted fixedly concentrically relatively to said shaft, said plate having a plurality of openings formed therein; an arm rotatably mounted on said shaft; a plunger carried by said arm and adapted upon movement of the same relatively to said plate for successively engaging in said openings; a supporting structure carried by said arm and extending angularly thereto; a second arm fixedly mounted on said shaft and projecting outwardly therefrom; a screw carried by said supporting structure; a nut threaded on said screw adapted for moving longitudinally thereof upon rotation of said screw; and means cooperating with said nut for effecting, upon engagement of said plunger in one of said openings, and upon rotation of said screw, a rotatable movement of said second arm.

3. An indexing device of the class described adapted for use with a rotating shaft comprising a plate mounted fixedly concentrically relatively to said shaft, said plate having a plurality of openings formed therein; an arm rotatably mounted on said shaft; a plunger carried by said arm and adapted upon movement of the same relatively to said plate for successively engaging in said openings; a supporting structure carried by said arm and extending angularly thereto; a second arm fixedly mounted on said shaft and projecting outwardly therefrom; a screw carried by said supporting structure; a nut threaded on said screw adapted for moving longitudinally thereof upon rotation of said screw; means cooperating with said nut for effecting, upon engagement of said plunger in one of said openings, and upon rotation of said screw, a rotatable movement of said second arm; and means for indicating the amount of circular movement effected in said arm.

4. An indexing device of the class described adapted for use with a rotatable shaft comprising a stationary plate having a plurality of openings; an arm rotatably mounted on said shaft; a supporting structure carried by said arm and extending angularly thereto; a screw rotatably mounted on said supporting structure; a nut carried by said screw adapted for movement longitudinally thereof upon rotation of said screw; means for indicating the degree of rotation of said screw; a second arm fixedly mounted on said shaft and adapted upon rotation for rotating said shaft; and means cooperating with said nut and said second arm for effecting a rotation of said second arm upon a rotation of said screw while said plunger is in engagement with one of said holes.

5. An indexing device of the class described adapted for use with a rotatable shaft comprising a stationary plate having a plurality of openings; an arm rotatably mounted on said shaft; a supporting structure carried by said arm and extending angularly thereto; a screw rotatably mounted on said supporting structure; a nut carried by said screw adapted for movement longitudinally thereof upon rotation of said screw; means for indicating the degree of rotation of said screw; a second arm fixedly mounted on said shaft and adapted upon rotation for rotating said shaft; means cooperating with said nut and said second arm for effecting a rotation of said second arm upon a rotation of said screw while said plunger is in engagement with one of said holes; and means for indicating the number of rotations of said screw.

6. In an indexing device of the class described adapted for use with a rotatable shaft, an arm rotatably mounted on said shaft; a second arm fixedly mounted upon said shaft and adapted for rotating the same; means for retaining said first mentioned arm stationary; and movable means carried by said first mentioned arm and adapted upon movement, while said first mentioned arm is stationary, for effecting a rotation of said second mentioned arm.

7. In an indexing device of the class described adapted for use with a rotatable shaft, an arm rotatably mounted on said shaft; a second arm fixedly mounted upon said shaft and adapted for rotating the same; means for retaining said first mentioned arm stationary; movable means carried by said first mentioned arm and adapted upon movement, while said first mentioned arm is stationary, for effecting a rotation of said second mentioned arm; and means for indicating the amount of rotation of said second mentioned arm.

WILLIAM J. VOCKE.